(12) United States Patent
Chen et al.

(10) Patent No.: US 10,966,074 B2
(45) Date of Patent: *Mar. 30, 2021

(54) POWER-EFFICIENT, BALANCED, AND RELIABLE TRUE WIRELESS BLUETOOTH STEREO AUDIO SOLUTION

(71) Applicant: Avago Technologies International Sales Pte. Limited, Singapore (SG)

(72) Inventors: Xianbo Chen, San Diego, CA (US); Chikan Kwan, San Diego, CA (US); Shawn Ding, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 161 days.

This patent is subject to a terminal disclaimer.

(21) Appl. No.: 16/240,581

(22) Filed: Jan. 4, 2019

(65) Prior Publication Data
US 2019/0141505 A1   May 9, 2019

Related U.S. Application Data

(63) Continuation of application No. 15/418,260, filed on Jan. 27, 2017, now Pat. No. 10,206,084.

(60) Provisional application No. 62/439,304, filed on Dec. 27, 2016.

(51) Int. Cl.
*H04B 7/00* (2006.01)
*H04W 76/14* (2018.01)
*H04W 4/80* (2018.01)

(52) U.S. Cl.
CPC ............. *H04W 4/80* (2018.02); *H04W 76/14* (2018.02); *Y02D 30/70* (2020.08)

(58) Field of Classification Search
CPC ........ H04W 4/80; H04W 76/14; Y02D 70/00; Y02D 70/10; Y02D 70/14; Y02D 70/144
See application file for complete search history.

(56) References Cited

U.S. PATENT DOCUMENTS

| | | | |
|---|---|---|---|
| 9,742,471 B1 * | 8/2017 | Thoen | H04L 67/04 |
| 2012/0058727 A1 | 3/2012 | Cook et al. | |
| 2012/0258727 A1 | 10/2012 | Wong et al. | |
| 2015/0124976 A1 | 5/2015 | Pedersen et al. | |

(Continued)

FOREIGN PATENT DOCUMENTS

| | | |
|---|---|---|
| CN | 105812906 A | 7/2016 |
| WO | WO-2014/184395 A2 | 11/2014 |

OTHER PUBLICATIONS

German Office Action on DE 102017012268.7 dated Mar. 25, 2020 (11 pages).

(Continued)

*Primary Examiner* — Xin Jia
(74) *Attorney, Agent, or Firm* — Foley & Lardner LLP (57) ABSTRACT

A power-efficient, balanced, and reliable true wireless Bluetooth stereo audio solution is provided. Two audio sink devices are used to render audio content received from an audio source. One sink device is connected to the audio source via a primary link. The other sink device sniffs communication on the primary link. The two sink devices are connected via a hybrid link. In some embodiments, a token is passed dynamically between the two sink devices. The sink device that has the token acts as a primary sink device on a primary link with the source. The other sink device acts as a slave to the primary link.

20 Claims, 6 Drawing Sheets

(56) References Cited

U.S. PATENT DOCUMENTS

| | | | |
|---|---|---|---|
| 2016/0037270 A1* | 2/2016 | Polinske | H04R 25/558 381/315 |
| 2016/0080877 A1 | 3/2016 | Holm et al. | |
| 2016/0112825 A1* | 4/2016 | Miller | H04W 12/04 455/41.2 |
| 2017/0238103 A1* | 8/2017 | Gehring | H04R 25/552 381/23.1 |

OTHER PUBLICATIONS

First Chinese Office Action on CN201711177589.2 dated Feb. 21, 2020, and English translation thereof (17 pages).

\* cited by examiner

POWER-EFFICIENT, BALANCED, AND RELIABLE TRUE WIRELESS BLUETOOTH STEREO AUDIO SOLUTION

CROSS REFERENCE TO RELATED APPLICATIONS

This application is a continuation of U.S. patent application Ser. No. 15/418,260, filed Jan. 27, 2017, which claims priority to and the benefit of U.S. Provisional Patent Application No. 62/439,304, filed Dec. 27, 2016. The entire contents of the foregoing are hereby incorporated herein by reference for all purposes.

FIELD OF THE DISCLOSURE

This disclosure generally relates to systems and methods for communicating audio signals, including but not limited to systems and methods for performing wireless Bluetooth stereo audio communications.

BACKGROUND OF THE DISCLOSURE

Bluetooth (BT) speakers have been developed for providing wireless audio solutions via a Bluetooth network. The term "speakers" as used herein refers to a pair of any electro-acoustic transducers and includes, but is not limited to, home and professional audio speakers and headphones, earphones, ear buds, etc. Conventional BT speakers support wireless communication of stereo audio between the BT speakers and an audio source. However, such BT speakers usually require a cumbersome cabled connection between the pair of BT speakers. It would be advantageous to provide an audio solution that enables true wireless stereo audio communication between the speakers.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Described herein are systems and methods for providing a power-efficient, balanced, and reliable true wireless stereo audio solution according to some illustrative embodiments. In certain aspects, some embodiments of the present stereo audio solution enable wireless communication between speakers and an audio source, as well as wireless communication between the speakers themselves. True wireless refers to wireless communication (e.g., via Bluetooth communications) between the speakers themselves, in some embodiments. In that way, cable connections between the speakers can be eliminated. Such truly wireless speakers can be more convenient for users to use. In certain aspects, some embodiments of the present stereo audio solution provide efficient and/or balanced power consumption on each wireless speaker, which therefore supports superior user experience arising from a longer streaming service per charge. This stereo audio solution includes a dynamic-token-based primary-secondary-selection algorithm between the speakers, which further supports a reliable audio communication. A speaker as used herein could refer to an audio sink that wirelessly receives signals (e.g., BT signals) comprising audio content, and renders or outputs the received audio content acoustically.

According to some embodiments, the present methods and systems use a wireless or Bluetooth network which provides a point-to-multipoint connection. In the point-to-multipoint connection, an audio source is connected to several audio sink devices via a Bluetooth channel. The audio source acts as a master of the BT network, in one or more embodiments. At least one of the sink devices acts as slaves of the BT network, in one or more embodiments. According to some embodiments, one or more sink devices operate as virtual slaves of the BT network, as explained below. In one or more embodiments, the sink devices include a pair of any electro-acoustic transducers, but are not limited to, home and professional audio speakers and headphones, earphones, ear buds, etc. The BT channel is shared by the pair of sink devices. One sink device acts as a slave of the BT network, whereas the other sink device(s) acts as virtual slave(s). There might be one or more virtual slaves. By way of illustration, the disclosure may sometimes refer to one virtual slave, or to multiple virtual slaves. The slave of the BT network communicates directly with the master, and is synchronized to the master via the BT channel, in one or more embodiments. The virtual slaves of the BT network sniff or eavesdrop on the communication between the slave and the master, such that the virtual slaves do not transmit any information (e.g., send an acknowledgment message) to the master. The master might not be aware of the existence of the virtual slaves, in one or more embodiments.

Some aspects of the present disclosure relate to embodiments of a system for wirelessly communicating audio content. The system includes a first audio sink device and a second audio sink device, in one or more embodiments. The first audio sink device and the second audio sink device are wirelessly connected via a hybrid link, in one or more embodiments. The hybrid link is a Bluetooth channel within a Bluetooth network, in one or more embodiments. The hybrid link is a logical link that comprises a signaling portion and a data forwarding portion, in one or more embodiments. Each of the audio sink devices may receive stereo audio content from the audio source and render a different audio channel of the stereo audio content, in one or more embodiments. The system further includes a link manager residing on at least one of the first or the second audio sink device, in one or more embodiments. The link manager compares a first link quality of a first wireless link between the first audio sink device and the audio source, with a second link quality of a second wireless link between the second audio sink device and the audio source, in one or more embodiments. In response to the first link quality being better than the second link quality, the link manager enables the first audio sink device to wirelessly receive the stereo audio content from the audio source via the first wireless link and to transmit messages to the audio source via the first wireless link, in one or more embodiments. The link manager enables the second audio sink device to wirelessly receive the stereo audio content from the audio source via the second wireless link, and disables transmission of messages from the second audio sink device to the audio source via the second wireless link, in one or more embodiments.

Certain aspects of this disclosure relates to embodiments of a method for wirelessly communicating audio content. The method includes wirelessly connecting, by a first audio sink device, to a second audio sink device via a hybrid link, the first and second audio sink devices each for rendering a different audio channel of stereo audio content wirelessly received from an audio source, in one or more embodiments. The link manager resides on at least one of the first audio sink device and the second audio sink device, in one or more embodiments. The link manager compares a first link quality of a first wireless link between the first audio sink device and the audio source, with a second link quality of a second wireless link between the second audio sink device and the audio source, in one or more embodiments. In response to the first link quality being better than the second link quality, the link manager enables the first audio sink device to wirelessly receive the stereo audio content from the audio source via the first wireless link and to transmit messages to the audio source via the first wireless link, in one or more embodiments. The link manager enables the second audio sink device to wirelessly receive the stereo audio content from the audio source via the second wireless link, and disables transmission of messages from the second audio sink device to the audio source via the second wireless link, in one or more embodiments.

Figure 1:
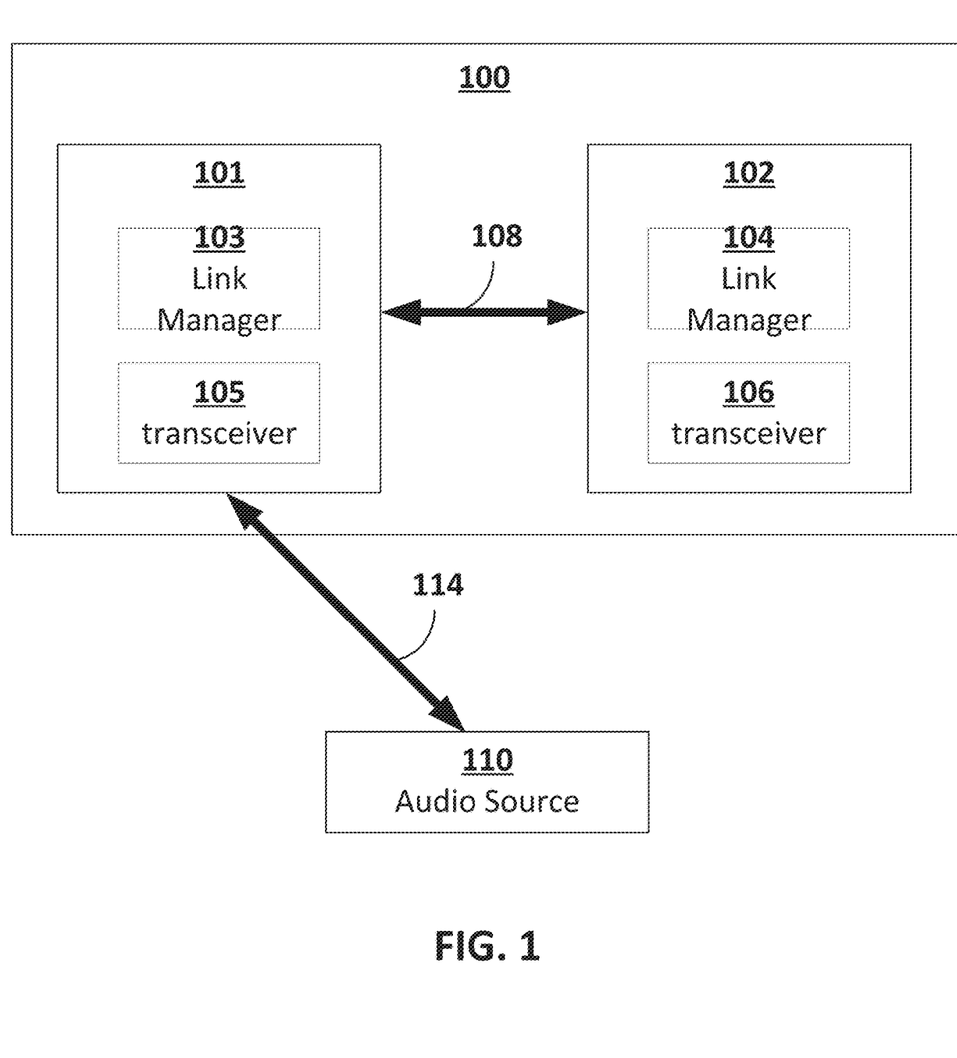
FIG. 1 is a block diagram depicting an embodiment of a system for wirelessly communicating audio content via a Bluetooth network according to some illustrative embodiments.

Referring to FIG. 1, a system 100 for wirelessly communicating audio content via a BT network is depicted according to an illustrative embodiment. According to some embodiments, the system 100 provides a primary link 114 for communications with an audio source 110. The primary link 114 is established based on BT technology, in one or more embodiments. According to some embodiments, the system 100 includes a first sink device 101 and a second sink device 102. According to some embodiments, the first sink device 101 and the second sink device 102 might comprise any type of speakers. According to some embodiments, the first sink device 101 and the second sink device 102 are designed or built to render any audio channels of stereo audio content. According to some embodiments, the audio source 110 could be implemented on any type of device that can provide audio content via BT or other wireless technology, such as a mobile device, PC, MP3 players, TV, etc. According to some embodiments, one of the first and second sink devices renders or audio-outputs a left channel of the stereo audio content and the other sink device is configured to render or audio-output a right channel of the stereo audio content. According to some embodiments, both sink devices 101 and 102 are able to receive stereo audio data packets. One or more of the sink and source devices includes one or more components or elements, e.g., link manager, transceiver. Each of the components, elements or other entities is implemented in hardware, or a combination of hardware and software, in one or more embodiments. For instance, each of these components, elements or entities could include any application, program, library, script, task, service, process or any type and form of executable instructions executing on hardware of the device 102, in one or more embodiments. The hardware includes circuitry such as one or more processors, memory devices, buses, interfaces, for example.

According to some embodiments, one of the first sink device 101 and the second sink device 102 acts or operates as a slave of the BT network, and the other sink device acts or operates as a virtual slave of the BT network. For example, as shown in FIG. 1, the sink device 101 acts as a slave of the BT network. The slave of the BT network receives audio data packets including stereo audio content from a master (e.g., audio source 110) of the BT network and to transmit messages to the audio source 110. In one or more embodiments, the messages include, but are not limited to, a response to the source based on the reception results. For example, such a message may indicate or comprise an acknowledgment of receiving audio data packets, a failure/error in receiving one or more data packets, occurrence of dropped data packets, a request for audio data packets, etc., in one or more embodiments.

The virtual slave of the BT network operates in a sniff (or sniffing, eavesdropping, or listening) mode according to some embodiments. According to some embodiments, the virtual slave of the BT network listens to transmissions between the master and the slave. According to some embodiments, the virtual slave of the BT network does not transmit messages to the audio source, and therefore the audio source might be not aware of the existence of the virtual slave. According to some embodiments, the virtual slave of the BT network communicates with the slave via a hybrid link 108. The hybrid link 108 is established based on BT or other wireless technology according to some embodiments. According to some embodiments, the slave and the virtual slave might switch roles based on the link quality of the primary link 114 that each has with the audio source.

The first sink device 101 may include a link manager 103 and/or a transceiver 105 according to some embodiments. The second sink device 102 includes a link manager 104 and/or a transceiver 106 according to some embodiments. The link manager 103 determines a first link quality of a potential link established between the first sink device 101 and the audio source 110 according to some embodiments. The link manager 104 determines a second link quality of a potential link established between the second sink device 102 and the audio source 110, in one or more embodiments. The first sink device 101 and the second sink device 102 are able to communicate or share the link qualities via the hybrid link 108. According to some embodiments, the first link manager 103 transmits the first link quality to the second sink device 102, and/or receives the second link quality from the second sink device 102 via the transceiver 105. The second link manager 104 transmits the second link quality to the first sink device 101, and/or receives the first link quality from the first sink device 101 via the transceiver 106, in one or more embodiments. The first link manager 103 and the second link manager 104 compare the first link quality with the second link quality according to some embodiments. In response to determining the first link quality is better or higher than the second link quality, the first link manager 103 enables the transceiver 105 to establish a primary link with the audio source 110, and the second link manager 104 disables the transceiver 106 from establishing a primary link with the audio source 110, in one or more embodiments. In response to determining the second link quality is better than the first link quality, the second link manager 104 enables the transceiver 106 to establish a primary link with the audio source 110, and the first link manager 103 disables the transceiver 105 from establishing a link with the audio source 110 according to some embodiments, in one or more embodiments.

As shown in FIG. 1, the first sink device 101 establishes the primary link 114 with the audio source 110 according to some embodiments. The transceiver 105 receives data packets (e.g., first data packets) from the audio source 110 and/or transmits messages to the audio source 110 via the primary link 114 according to some embodiments. The first data packets include one or more data packets transmitted via the primary link 114. The first sink device 101 communicates with the second sink device 102 via the hybrid link 108. According to some embodiments, the hybrid link 108 is established and/or used independently from the primary link 114. According to some embodiments, the hybrid link 108 is established before the primary link 114 is established. According to some embodiments, the hybrid link 108 is established after the primary link 114 is established. According to some embodiments, the audio source 110 is not aware of information being transmitted via the hybrid link 108. According to some embodiments, the first sink device 101 transmits messages (e.g., via the hybrid link to the second sink device) indicating that the primary link 114 is established.

According to some embodiments, the second sink device 102 receives second data packets by sniffing or listening to communications between the first sink device 101 and the audio source 110 via the primary link 114. According to some embodiments, the data packets (e.g., first and second data packets) received by 101 and 102 are the same, e.g., assuming no dropped packets during reception. According to some embodiments, the second sink device 102 (e.g., while operating a virtual slave or in listening mode) does not communicate to the audio source 110, such that the audio source might not be aware of the operation/activity or existence of the second sink device 102. According to some embodiments, the first sink device 101 transmits communication information related to the first data packets (e.g., results of the reception of the first data packets, such as completion of reception, successful reception or failure in reception, whether partial or full) to the second sink device 102 via the hybrid link 108. According to some embodiments, upon receiving the communication information from the first sink device 101, the second sink device 102 determines whether the received second data packets include all of the first data packets. In response to determining one or more data packets of the first data packets are missing in the second data packets, the second sink device 102 sends a request for missing packets to the first sink device 101 via the hybrid link 108, in one or more embodiments. Upon receiving the request, the first sink device 101 transmits the one or more packets that are not in the second data packets to the second sink device 102, in one or more embodiments. In response to determining that one or more data packets of the second data packets are missing in the first data packets, the second sink device 102 transmits the one or more data packets that are not in the first data packets to the first sink device 101 (e.g., in response to, or without any prompting or request from the first sink device for the missing data packets), in one or more embodiments.

According to some embodiments, the second sink device 102 is configured similarly as the first sink device 101 (e.g., to receive signals with audio content). The second sink device 102 transmits communication information (or reception results) related to the second data packets to the first sink device 101 via the hybrid link 108 according to some embodiments. According to some embodiments, upon receiving the communication information from the second sink device 102, the first sink device 101 determines whether the received first data packets include all of the second data packets. In response to determining that one or more data packets of the second data packets are missing in the first data packets, the first sink device 101 sends a request for missing packets to the second sink device 102 via the hybrid link 108, in one or more embodiments. Upon receiving the request, the second sink device 102 transmits the one or more packets that are not in the first data packets to the first sink device 101, in one or more embodiments. In response to determining that one or more data packets of the received first data packets are missing in the second data packets, the first sink device 101 transmits the one or more data packets that are not in the second data packets to the second sink device 102 (e.g., in response to, or without any prompting or request from the first sink device for the missing data packets), in one or more embodiments.

According to some embodiments, the link manager in the slave (e.g., link manager 103 as shown in FIG. 1) monitors the link quality of the primary link 114 continually or periodically. The link manager 103 compares the link quality with a threshold value according to some embodiments. If the link quality falls below the threshold value, the link manager 103 transmits, moves or surrenders a token (or role of being a slave or primary sink) to the second sink device 102. According to some embodiments, upon transmitting the token from the first sink device 101 to the second sink device 102, the second sink device 102 switches to assume the role of a slave of the BT network, and the first sink device 101 switches to assume the role of a virtual slave of the BT network. According to some embodiments, in response to role reversal or the token transmission from the first sink device 101 to the second sink device 102, the first sink device 101 leaves or relinquishes use of the primary link, while the second sink device 102 enters or assumes use of the primary link. According to some embodiments, in response to role reversal or the token transmission from the first sink device 101 to the second sink device 102, the primary link 114 between the first sink device 101 and the audio source 110 is disconnected or disestablished, and a primary link between the second sink device 102 and the first sink device 101 is established. According to some embodiments the audio source 110 may not be aware of (e.g., is agnostic about) the role reversal/transition between the first sink device 101 and the second sink device 102. Although a token is discussed above, this is merely by way of illustration and not intended to be limiting in any way. In place of a token (e.g., a configuration, setting, parameter or role identifier) that can be passed or transmitted between sink devices, the link manager(s) is/are able to simply negotiate for, instruct, configure or select one of the sink devices to be the slave and the other as the virtual slave.

Figure 2:
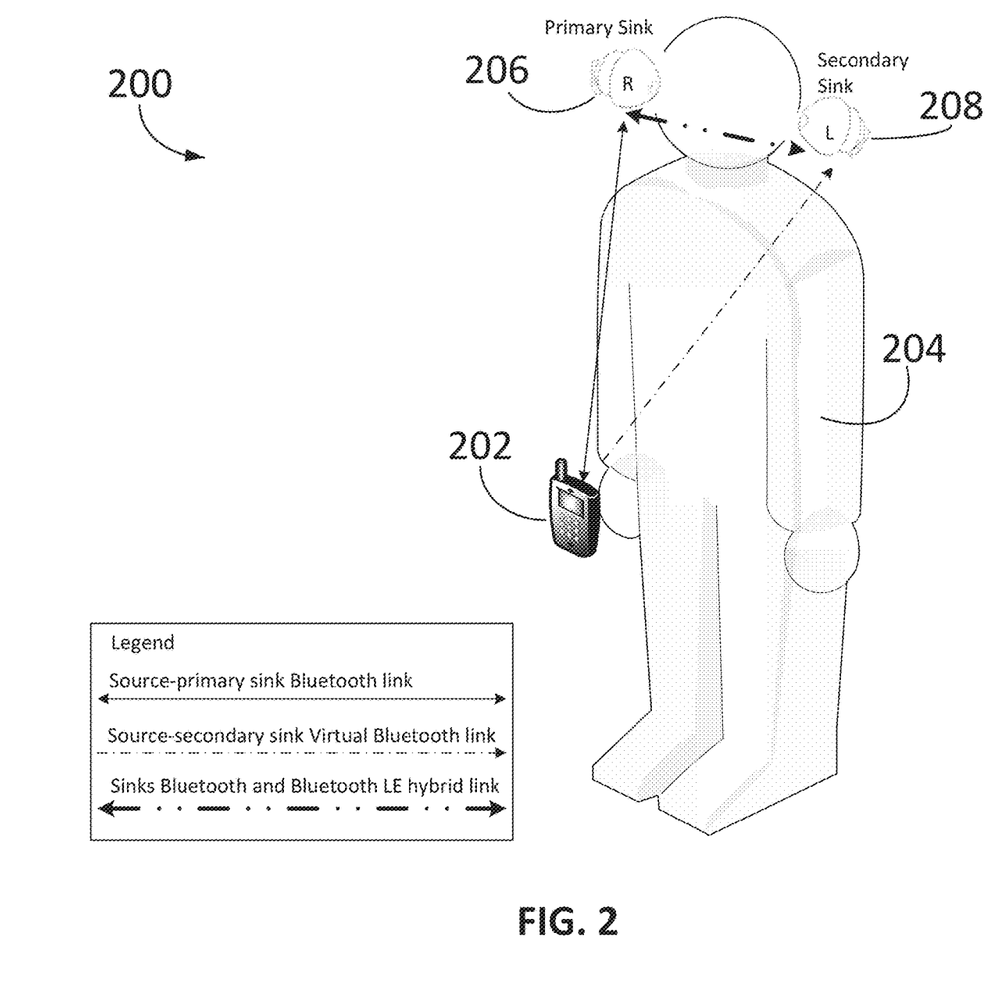
FIG. 2 is a diagram of a BT network topology for communicating audio content according to some illustrative embodiments.

Referring now to FIG. 2, a BT network topology 200 for communicating audio content is depicted according to some illustrative embodiments. According to some embodiments, a user 204 uses BT speakers 206 and 208 to render audio content from an audio source 202 for listening. The BT speakers 206 and 208 could be any type of speakers that is able to render stereo audio content according to some embodiments. According to some embodiments, the audio source 202 could comprise any type of device that provides audio content via BT technology. According to some embodiments, the speakers 206 and 208 are operated as sink devices receiving information from the audio source 202. According to some embodiments, a token or specific role (as slave) is being passed dynamically between the two sink devices. According to some embodiments, only one of the sink devices is allowed to have the token or role at any given time. According to some embodiments, the sink device that has the token or assign the specific role, assumes operations as a primary sink device and the other that does not have the token or role assume the role of a secondary sink device.

According to some embodiments, as shown in FIG. 2, the speaker 206 is assigned the token or role and acts as a primary sink within the BT network. According to some embodiments, the primary sink device 206 establishes a source-primary sink BT link between the audio source 202 and the primary sink device 206. According to some embodiments, the source-primary sink BT link is a bidirectional communication link so that the primary sink device 206 is able to transmit to and/or receive information from the audio source. According to some embodiments, the primary sink device 206 is able to receive audio content from the audio source 202 via the source-primary sink BT link. According to some embodiments, the primary sink device 206 is able to transmit messages indicating reception results of the received audio content to the audio source 202. According to one or more embodiments, from the perspective of the audio source, there is no link up or down at any time during the whole transaction, e.g., the sink device(s) forms or defines such links rather than the audio source. In some or more embodiments, the audio source is agnostic about which sink device(s) forms or uses any of the links.

According to some embodiments, a hybrid link is established between the primary sink device 206 and the secondary sink device 208. The hybrid link includes or corresponds to a logical link that includes a signaling portion and data forwarding portion according to some embodiments. The hybrid link may be a Bluetooth Low Energy (BT LE) link according to some embodiments. The primary sink device 206 transmits synchronization information to the secondary sink device 208 using the signaling portion of the hybrid link according to some embodiments. The secondary sink device 208 receives the synchronization information from the primary sink device 206 via the hybrid link and synchronizes to the source-primary sink BT link using the synchronization information according to some embodiments. The secondary sink device 208 tracks or follows the transmission activities in the source-primary sink BT link according to some embodiments. The secondary sink device 208 may operate as a shadow slave or virtual slave to the audio source 202 without transmitting any response to the audio source 202 according to some embodiments.

According to some embodiments, the audio source 202 transmits first audio data to the primary sink via the BT link. According to some embodiments, the secondary sink device 208 eavesdrops on or listens to the first audio data via a source-secondary sink virtual BT link. The source secondary sink virtual BT link corresponds to a one-way data communication virtual link according to some embodiments. Through this one-way data communication virtual link, the secondary sink device 208 is able to receive data transmitted over source-primary sink BT link according to some embodiments. The audio source 202 might be not aware of the activity and/or existence of the secondary sink device 208 according to some embodiments. The primary sink device 206 responds or acknowledges to the audio source 202 before receiving a second audio data from the audio source 202 according to some embodiments. The primary sink device 206 and the secondary sink device 208 are able to exchange or share their data packet reception results from the audio source 202 according to some embodiments. The primary sink device 206 and the secondary sink device 208 are able to determine whether the first data is successfully received by both devices according to some embodiments. In response to determining that at least a portion of the first data is not successfully received by one of the primary and secondary sink devices, the determined portion of the first data is transmitted to the one of the primary and secondary sink devices using the forwarding potion of the hybrid link according to some embodiments. For example, if the primary sink device 206 fails to receive a few data packets of the first data, the secondary sink device 208 forwards the few data packets to the primary sink device 206 via the hybrid link, in one or more embodiments.

Figure 3:
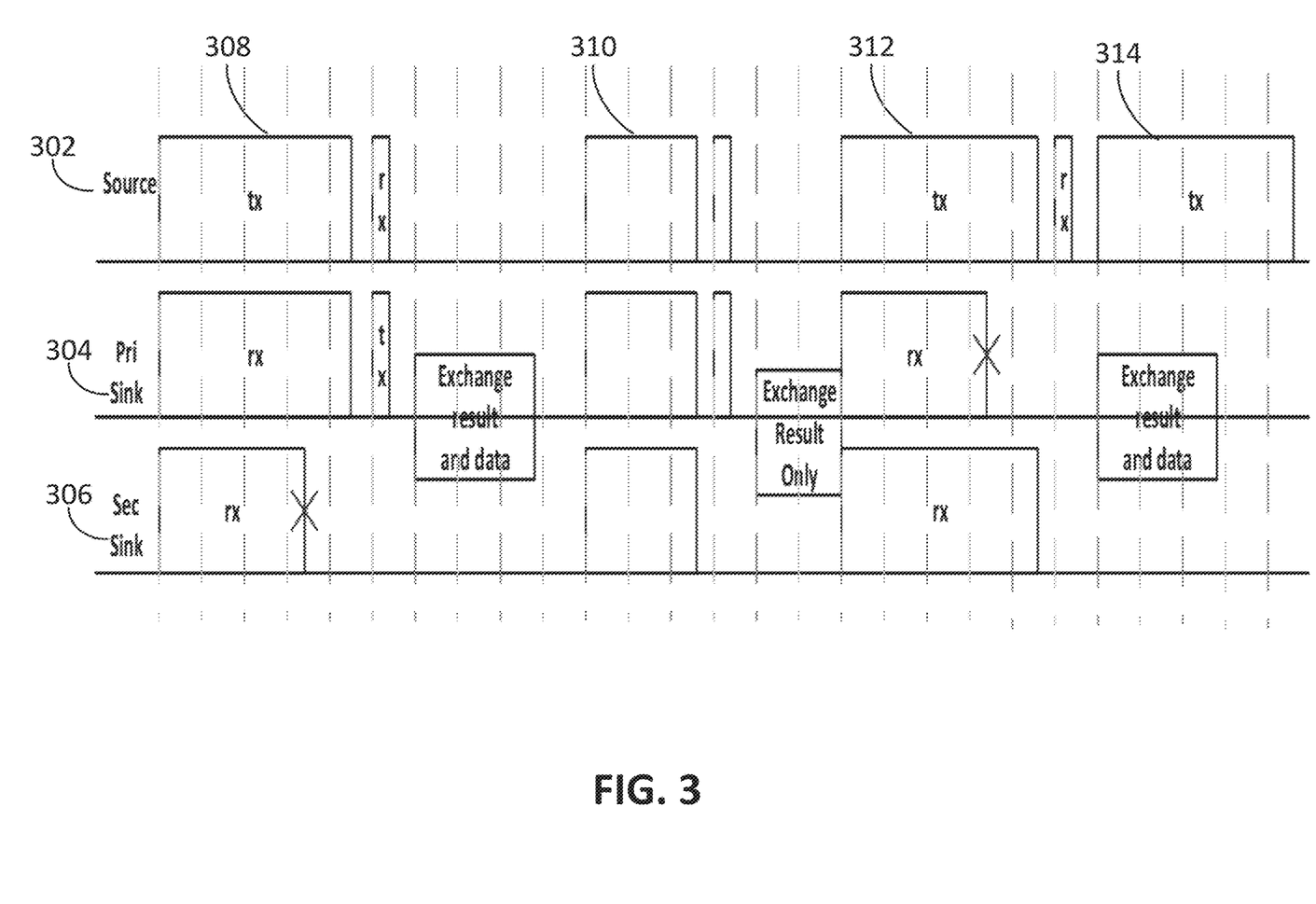
FIG. 3 is a diagram representing BT network operation according to an illustrative embodiment.

Referring to FIG. 3, a BT network operation is shown according to an illustrative embodiment. The BT network operation include transmissions and receptions of data packets over time, for an audio source 302, a primary sink device 304, and a secondary sink device 306 according to some embodiments, in one or more embodiments. The audio source specific operations 302 include transmitting a first data to the primary sink device 304 during a first time slot (interval or window) 308, in one or more embodiments. Upon receiving the first data during the first time slot 308, the primary sink device 304 transmits a response/acknowledgment to the audio source 302 based on the reception result, in one or more embodiments. The secondary sink device 306 eavesdrops on the first data transmitted from the audio source 302 to the primary sink device 304, in one or more embodiments. As shown in FIG. 3, during the first time slot 308, the secondary sink device 306 fails to receive at least a portion of the first data. The primary sink device 304 and the secondary sink device 306 exchange their reception results, in one or more embodiments. In response to the exchange of reception results, the primary sink device 304 forwards the portion of the first data to the secondary sink device 306 before transmission of a second data at a second time slot 310, in one or more embodiments.

At the second time slot 310, the audio source 302 transmits a second data to the primary sink device 304, in one or more embodiments. Upon receiving the second data, the primary sink device 304 transmits a response/acknowledgment to the audio source 302 based on the reception result, in one or more embodiments. The secondary sink device 306 eavesdrops on the second data at the second time slot 310, in one or more embodiments. The audio source 302 might not be aware of the existence/operation of the secondary sink device 306. The primary sink device 304 and the secondary sink device 306 then exchange the reception results, in one or more embodiments. During the second time slot 310, the primary sink device 304 and the secondary sink device 306 both receives the second data successfully, so that no data forwarding occurs between the sink devices 304 and 306, in one or more embodiments. Since the reception results being exchanged would indicate that both sink devices have successfully received the second data, no portion of such data is necessary to be exchanged or shared via the hybrid link, before transmission of a third data at a third time slot 312, in one or more embodiments.

During time slot 312, the audio source 302 transmits a third data to the primary sink device 304, in one or more embodiments. In response to receiving the third data, the primary sink device 304 transmits a response to the audio source 302 indicating at least a portion of the third data is not successfully received by the primary sink device 304, in one or more embodiments. The secondary sink device 306 eavesdrops on the third data transmitted from the audio source 302 to the primary sink device 304 during the third time slot 312, in one or more embodiments. In a fourth time slot 314, the primary sink device 304 and the secondary sink device 306 exchange their reception results. In response to the exchange of the reception results, the secondary sink device 306 transmits the at least a portion of the third data to the primary sink device 304 during the fourth time slot 314, in one or more embodiments. Because the primary sink device 304 failed to receive the third data during the third time slot 312, the primary sink device 304 does not acknowledge successful receipt of the third data to the audio source, in one or more embodiments. As such, the audio source is not aware of the incomplete reception, and proceeds to transmit a fourth data during the fourth time slot 314, in one or more embodiments. According to some embodiments, data transmission between the sink devices and data transmission between the audio source and the primary sink device are independent transmissions via different BT links and/or channels. The BT links and/or channels do not interfere with each other, in one or more embodiments.

Figure 4:
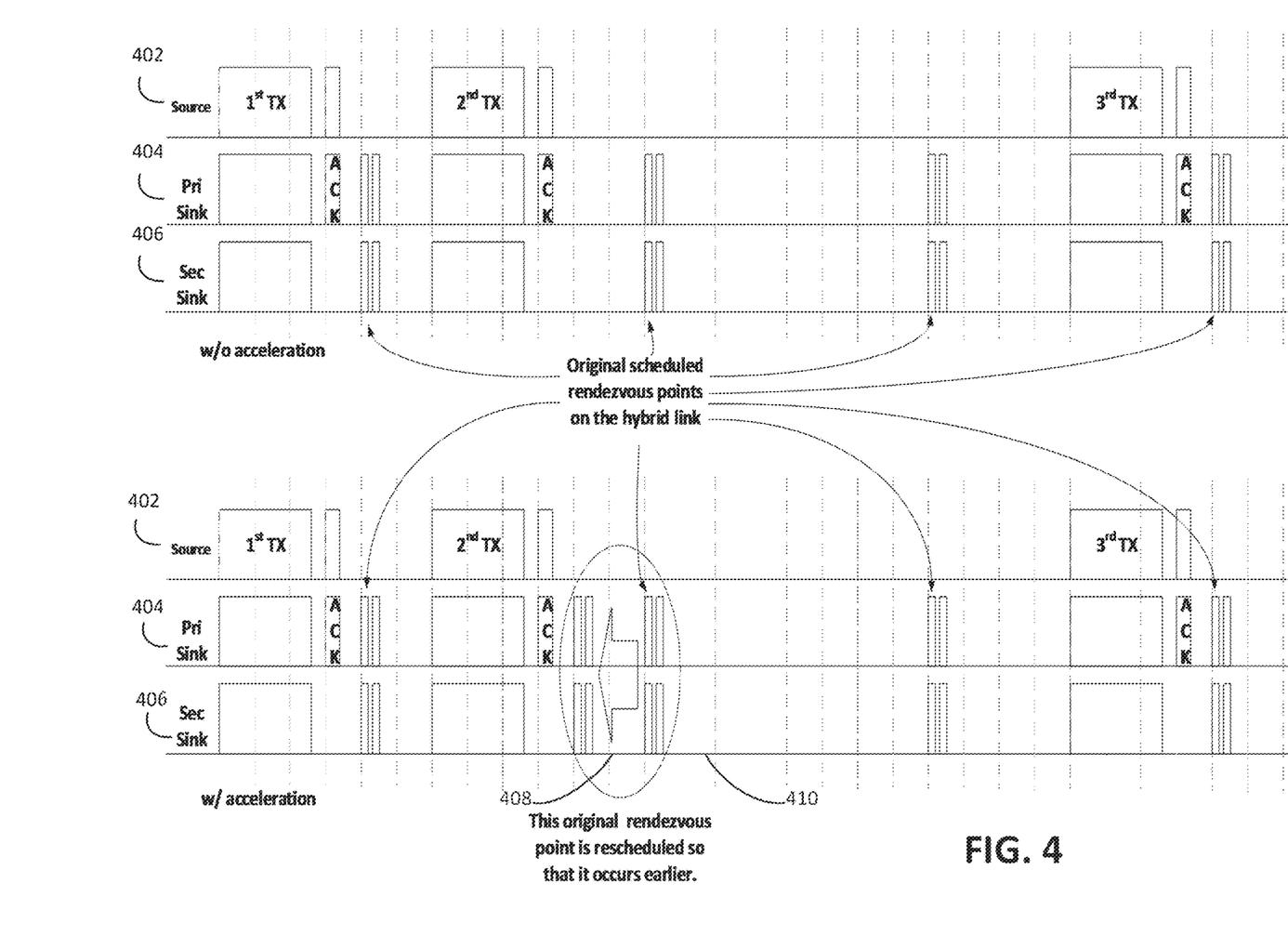
FIG. 4 is a diagram showing BT network acceleration according to an illustrative embodiment.

Referring to FIG. 4, a BT network acceleration operation is depicted according to an illustrative embodiment. An audio source 402 transmits audio content to a primary sink device 404 via a BT link, in one or more embodiments. The audio content is transmitted according to a BT schedule. For example, audio content transmission of a first data is scheduled to begin at a first time instance, a second data is scheduled to begin at a second time instance, etc., in one or more embodiments. The primary sink device 404 and the secondary sink device 406 communicate with each other via a hybrid link, in one or more embodiments. The communication on the hybrid link is scheduled at predefined rendezvous points. Since communications on the hybrid link are in some embodiments independent from at least some data transmissions in the BT link between the audio source and the primary sink device 404, the rendezvous points for the hybrid link might not line up closely with the data transmissions of the BT schedule, in one or more embodiments. For example, there might be time lags between each BT link transmission and a following hybrid link transmission, in one or more embodiments. For example, a rendezvous point 410 at the hybrid link is scheduled for a significant time period after a data communication between the audio source 402 and the primary sink device 404 is completed, in one or more embodiments. This time period is wasted since no communication has happened during that time period on the hybrid link, in one or more embodiments.

In one or more embodiments, it might be advantageous to provide an acceleration method for scheduling the hybrid link transmissions. Based on the acceleration method, communication on the hybrid link between sink devices is able to occur as soon as communications between the audio source 402 and the primary sink device 404 is complete, in one or more embodiments. As shown in FIG. 4, the communication between the sink devices via the hybrid link is originally scheduled at a rendezvous point 410, in one or more embodiments. To accelerate network operations, the communication over the hybrid link may begin immediately at time instance 408 in response to a determination (e.g., by a link manager and/or the primary sink device) that the data communication between the audio source 402 and the primary sink device 404 is complete, in one or more embodiments. This acceleration method is able to improve real-time performance of the BT network operation, in one or more embodiments. According to some embodiments, if any sink device happens to have missed a data transmission from the audio source 402, and therefore cannot begin communications on the hybrid link immediately, the sink devices may follow the original schedule of rendezvous points to next begin communications at the rendezvous point 410.

Figure 5:
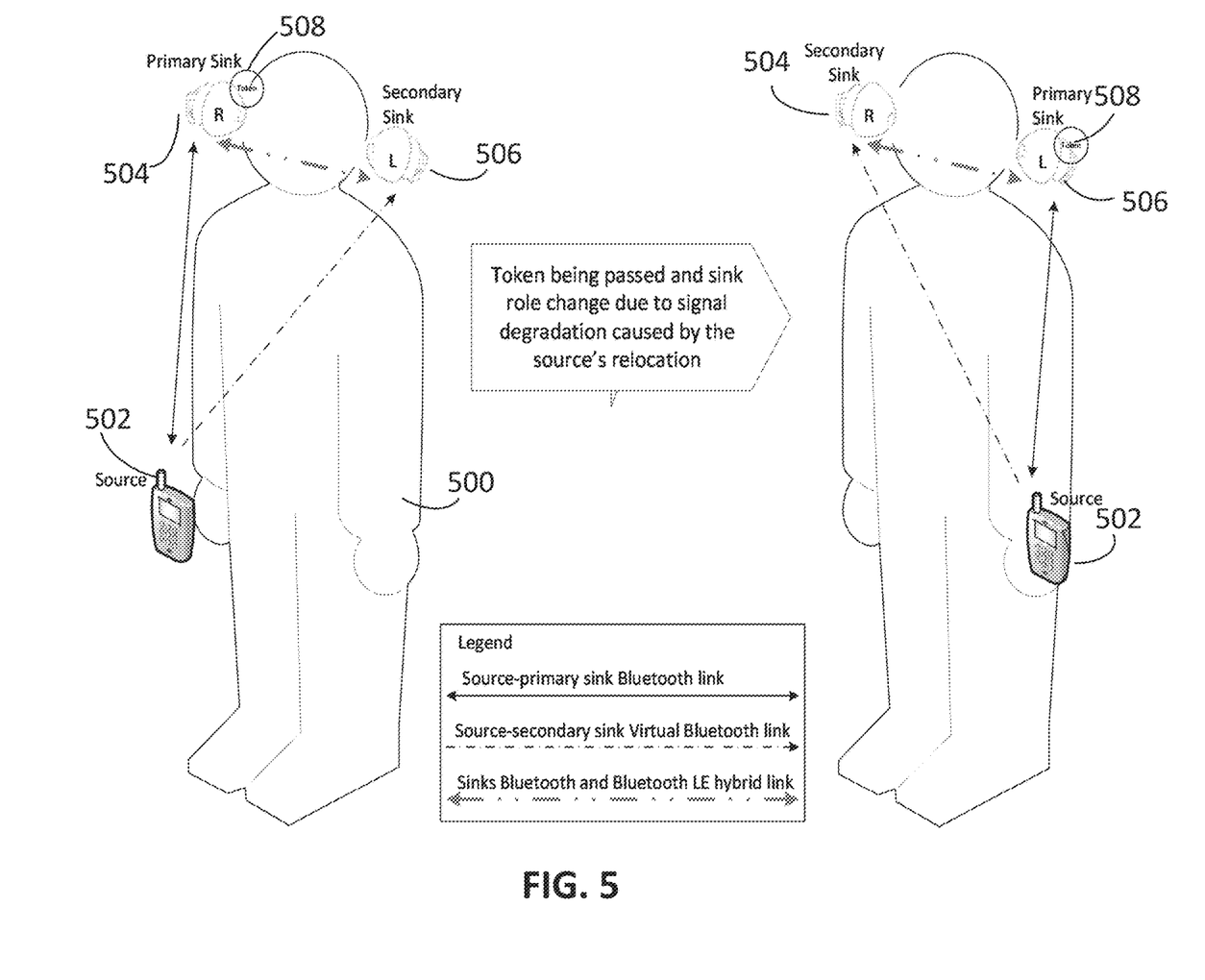
FIG. 5 is a diagram of a BT audio configuration implemented with a token handling approach according to an illustrative embodiment.

Referring to FIG. 5, a BT audio solution implemented with a token handling algorithm is depicted according to an illustrative embodiment. A user 500 uses a first speaker 504 and a second speaker 506 to listen to stereo audio content received wirelessly from an audio source 502, in one or more embodiments. The first speaker 504 corresponds to a right speaker for rendering a right channel of the stereo audio content according to some embodiments. The second speaker 506 corresponds to a left speaker for rendering a left channel of the stereo audio content according to some embodiments. A token 508 (or role of being primary sink device) is passed dynamically between the first and second speakers. When the first speaker 504 has the token 508, the first speaker 504 operates as a primary sink device, and the second speaker 506 operates as a secondary sink device according to some embodiments. The primary sink device is connected to the audio source 502 via a source-primary sink BT link. The source-primary sink BT link provides bidirectional communication according to some embodiments.

The audio source 502 may transmit audio content to the primary sink via the source-primary sink BT link according to some embodiments. In response to receiving the audio content, the primary sink device responds to the audio source 502 based on the reception result according to some embodiments. A hybrid link is established between the primary sink device and the secondary sink device. According to some embodiments, the hybrid link is established independently from the source-primary sink BT link. The primary sink device transmits messages indicative of the data transmission over the source-primary sink BT link, to the secondary sink device via the hybrid link. The secondary sink device performs sniffing or listening on the communication over the source-primary sink BT link, so that the secondary sink device is synchronized to the source-primary sink BT link as a virtual slave.

The first speaker 504 determines link quality of a potential link between the first speaker 504 and the audio source 502 according to some embodiments. The second speaker 506 determines link quality of a potential link between the second speaker 506 and the audio source 502. The first speaker 504 and the second speaker 506 exchange or share the link quality information via the hybrid link. The token 508 may be passed to a speaker that has a better link quality according to some embodiments.

According to some embodiments, when the first speaker 504 has the token 508, the first speaker 504 operates as the primary sink device. The first speaker 504 monitors the link quality of the source-primary sink BT link. Upon detecting that the link quality has degraded to a level below a threshold value, the first speaker 504 passes the token 508 to the second speaker 506 according to some embodiments. In response to receiving the token 508 from the first speaker 504, the second speaker 506 operates as a primary sink device and assumes the slave device role in the source-primary sink BT link with the audio source 502 according to some embodiments. In response to passing the token 508 to the second speaker 506, the first speaker 504 leaves from the source-primary sink BT link, and instead uses or maintains a source-secondary since virtual BT link with the audio source.

According to some embodiments, link quality degradation with a sink device is caused by source's relocation (e.g., relative to the sink device). For example, as shown in FIG. 5, when the user places the audio source 502 on his/her right side which is closer to the first speaker 504, the first speaker 504 would have a better link quality to operate as a primary sink device and communicate with the audio source 502 via the source-primary sink BT link. When the user replaces the audio source 502 to his left side which is closer to the second speaker 506, the first speaker 504 is able to detect a link degradation caused by the relocation, in one or more embodiments. In response to detecting the degradation, the first speaker 504 passes the token 508 to the second speaker 506. Upon receiving the token, the second speaker connects to the audio source 502 as the primary sink device via the source-primary sink BT link, and the first speaker 504 leaves from or relinquishes use of the source-primary sink BT link, and instead maintains or uses a source-secondary since virtual BT link with the audio source, in one or more embodiments. According to some embodiments, the primary sink device monitors the link quality of the source-primary sink BT link.

Figure 6:
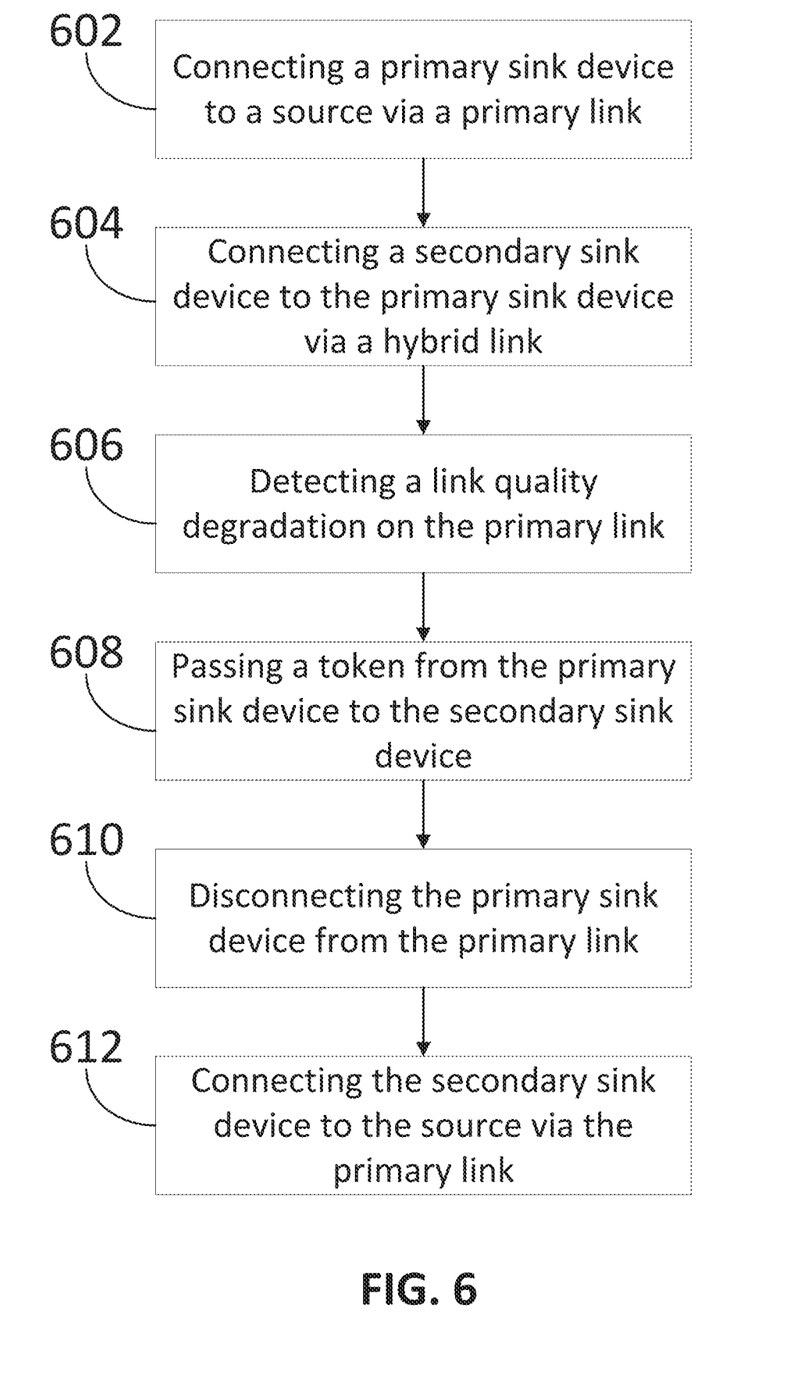
FIG. 6 is a flow diagram of a method for wirelessly communicating audio content according to an illustrative embodiment.

Referring now FIG. 6, a flow diagram of a BT stereo audio solution is depicted according to an illustrative embodiment. At step 602, a source transmits stereo audio data to a primary sink device via a primary link. Upon receiving the stereo audio data, the primary sink device responds to the source based on the reception result. According to some embodiments, the primary link is implemented or established as a BT based link, and/or a bidirectional link. According to some embodiments, the source operates as a master of the primary link, and the primary sink device operates as a slave.

At step 604, the primary sink device is connected to a secondary sink device via a hybrid link. In one or more embodiments, a first audio sink device wirelessly connects to a second audio sink device via a hybrid link. Each of the primary and secondary audio sink devices is configured to render a different audio channel of stereo audio content wirelessly received from an audio source. The hybrid link is established or implemented different or independent from the primary link according to some embodiments. According to some embodiments, the hybrid link corresponds to a logical BT LE link. The primary sink passes all information for synchronizing the secondary sink to the primary link, so that the secondary sink device is able to follow successfully the source's transmission activities. The primary sink device transmits reception results and/or synchronization information to the secondary sink device via the hybrid link according to some embodiments. The secondary sink device listens to or eavesdrops on the data communication on the primary link according to some embodiments. With respect to using the hybrid link, the primary sink device operates as a master and the secondary sink device operates as a slave according to some embodiments.

At step 606, the primary sink device monitors the primary link connection and determine whether link quality of the primary link has degraded according to some embodiments. For instance, the primary sink device experiences or encounters difficulty on communicating with the source device, in one or more embodiments. According to some embodiments, the primary sink device monitors the primary link connection continuously or intermittently, or at intervals dynamically determined based on prior monitoring results. According to some embodiments, the primary sink device monitors the primary link connection periodically.

At step 608, upon detecting a drop or degradation in the link quality of the primary link, the primary sink device passes a token to (or switches roles with) the secondary sink device according to some embodiments. According to some embodiments, the link quality degradation may be caused by source's relocation. According to some embodiments, the primary sink device includes a link manager configured to compare a first link quality of the primary wireless link between the primary audio sink device and the audio source, with a second link quality of the secondary wireless link between the second audio sink device and the audio source. In one or more embodiments, the link manager detects, determines or establishes that between the second link quality and the first link quality, one is better than the other. Upon detecting that the second link quality is better than the first link quality for instance, the primary device may pass the token to the secondary sink device. In one or more embodiments, the link manager passes a token (e.g., from the second audio sink device) to the first audio sink device in response to the first link quality being better than the second link quality, corresponding to the first audio sink device being enabled to transmit messages to the audio source. According to some embodiments, the token is passed dynamically between the primary sink device and the secondary sink device in accordance with link qualities relative to the sink devices. Upon passing the token, the role of the sink devices is switched according to some embodiments. For example, when the primary sink device passes the token to the secondary sink device, the primary sink device assumes operation as a secondary sink device, and the secondary sink device assumes operation as a primary sink device according to some embodiments.

At step 610, upon passing the token to the secondary sink device, the primary sink device leaves, disconnects from or relinquishes use of the primary link and assumes the role of a secondary sink (e.g., using a secondary link, for listening in to data transmissions from the source device) according to some embodiments. In response to disconnecting, leaving or departing from the primary link, the primary sink device continues to communicate with the secondary sink device via the hybrid link according to some embodiments. With respect to using the hybrid link, the primary sink device switches to the role of a slave, and the secondary sink device assumes the role of a master according to some embodiments.

At step 612, upon receiving the token from the primary sink device, the secondary sink device is connected to the source via the primary link according to some embodiments. In response to joining, entering, using or connecting to the primary link, the secondary sink device is switched to be the primary sink device within the BT network according to some embodiments. The secondary sink device transmits synchronization information to the primary sink device via the hybrid link, so that the primary sink device is able to be synchronized to the primary link as a virtual slave according to some embodiments. According to some embodiments, the link manager enables the primary audio sink device to wirelessly receive the stereo audio content from the audio source via the primary wireless link and to transmit messages to the audio source via the primary wireless link. According to some embodiments, the link manager enables secondary audio sink device to wirelessly receive the stereo audio content from the audio source via the secondary wireless link, in response to the first link quality being better than the second link quality. The link manager disables transmission of messages from the secondary audio sink device to the audio source via the secondary wireless link, in response to the first link quality being better than the second link quality, in one or more embodiments. In one or more embodiments, the link manager enables the secondary audio sink device to transmit messages to the audio source via the secondary wireless link, in response to the second link quality being better than the first link quality. In one or more embodiments, the link manager disables transmission of messages from the first/primary audio sink device to the audio source via the first or primary wireless link, in response to the second wireless link quality being better or higher than the first link quality.

In one or more embodiments, the link manager (which can be part of the first audio sink device) determines or detects whether a first packet of the stereo audio content received by the first audio sink device is received by the second audio sink device. In one or more embodiments, in response to determining that a portion of the stereo audio content is not received by the second audio sink device, the link manager enables the first audio sink device to transmit the portion of the stereo audio content to the second audio sink device via the hybrid link.

The embodiments of the present disclosure may be practiced in a variety of wireless communication devices that operate in a wireless Bluetooth (BT) environment or network. The embodiments of the present disclosure may be readily adapted to other wireless standards, protocols, fields, field lengths, field content, frequency bands, number of antennas, antenna arrays, sensors, devices, etc.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed, in one or more embodiments. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between other elements, and/or indirect coupling between other elements as recognized by one of average skill in the art.

It should be noted that certain passages of this disclosure can reference terms such as "first" and "second" in connection with packets, devices, communication protocols, etc., for purposes of identifying or differentiating one from another or from others. These terms are not intended to merely relate entities (e.g., first packets and second packets) temporally or according to a sequence, although in some cases, these entities can include such a relationship. Nor do these terms limit the number of possible entities (e.g., devices) that can operate within a system or environment. It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

We claim:

1. A first sink device comprising:
a first transceiver configured to form a first wireless link with an audio source device, the audio source device communicatively coupled to a second transceiver of a second sink device through a second wireless link, the first transceiver configured to form a third wireless link with the second transceiver of the second sink device; and
a link manager coupled to the first transceiver, the link manager configured to:
compare a first link quality of the first wireless link with a second link quality of the second wireless link, and
in response to the first link quality being better than the second link quality, configure the first transceiver to bidirectionally communicate with the audio source device via the first wireless link and configure the second transceiver to unidirectionally receive communication from the audio source device via the second wireless link.

2. The first sink device of claim 1, further comprising:
a speaker configured to render a first audio channel of audio content received through the first wireless link, the second sink device configured to render a second audio channel of the audio content.

3. The first sink device of claim 2, wherein, in response to the first link quality being better than the second link quality, the first transceiver is configured to:
transmit the second audio channel of the audio content to the second transceiver of the second sink device through the third wireless link.

4. The first sink device of claim 2, wherein, in response to the first link quality being better than the second link quality, the first transceiver is configured to:
instruct the second transceiver to receive the second audio channel of the audio content from the audio source device through the second wireless link.

5. The first sink device of claim 1, wherein the link manager is further configured to:
in response to the second link quality being better than the first link quality, configure the second transceiver to bidirectionally communicate with the audio source device via the second wireless link and configure the first transceiver to unidirectionally receive communication from the audio source device via the first wireless link.

6. The first sink device of claim 1, wherein the audio source device is unaware of the third wireless link between the first transceiver and the second transceiver.

7. The first sink device of claim 6, wherein the first transceiver is configured to receive information regarding the second link quality through the third wireless link.

8. The first sink device of claim 7, wherein the first transceiver is configured to:
   transmit information regarding the first link quality to the second transceiver of the second sink device through the third wireless link.

9. The first sink device of claim 1, wherein the audio source device is unaware of the second sink device, while the first transceiver bidirectionally communicates with the audio source device.

10. A system for wirelessly communicating audio content, comprising:
   an audio source device configured to store the audio content;
   a first audio sink device coupled to the audio source device through a first wireless link, the first audio sink device configured to render a first audio channel of the audio content; and
   a second audio sink device coupled to the audio source device through a second wireless link, the second audio sink device configured to render a second audio channel of the audio content, the first audio sink device including a link manager configured to:
      compare a first link quality of the first wireless link with a second link quality of the second wireless link, and
      in response to the first link quality being better than the second link quality, configure the first audio sink device to bidirectionally communicate with the audio source device via the first wireless link and configure the second audio sink device to unidirectionally receive communication from the audio source device via the second wireless link.

11. The system of claim 10, wherein, in response to the first link quality being better than the second link quality, the first audio sink device is configured to:
   transmit the second audio channel of the audio content to the second audio sink device through a third wireless link between the first audio sink device and the second audio sink device.

12. The system of claim 11, wherein the audio source device is unaware of the second audio sink device while the first audio sink device bidirectionally communicates with the audio source device.

13. The system of claim 10, wherein, in response to the first link quality being better than the second link quality, the second audio sink device is configured to:
   receive the second audio channel of the audio content from the audio source device through the second wireless link.

14. The system of claim 10, wherein, in response to the second link quality being better than the first link quality, the link manager is further configured to:
   configure the second audio sink device to bidirectionally communicate with the audio source device via the second wireless link and configure the first audio sink device to unidirectionally receive communication from the audio source device via the first wireless link.

15. The system of claim 10, wherein the first audio sink device is configured to receive information regarding the second audio sink device through a third wireless link between the first audio sink device and the second audio sink device.

16. The system of claim 15, wherein the audio source device is unaware of the third wireless link between the first audio sink device and the second audio sink device.

17. The system of claim 15, wherein the first audio sink device is configured to:
   transmit information regarding the first link quality to the second audio sink device through the third wireless link.

18. A system for wirelessly communicating audio content, comprising:
   a first audio sink device;
   a second audio sink device, wherein the first audio sink device and the second audio sink device are wirelessly connected via a hybrid link, and are each configured to render a different audio channel of the audio content wirelessly received from an audio source device; and
   a link manager residing on the first audio sink device, the link manager configured to:
      select the second audio sink device to bidirectionally communicate with the audio source device, by:
         enabling the first audio sink device to wirelessly receive the audio content from the audio source device via a first wireless link between the first audio sink device and the audio source device, and disabling the first audio sink device from wirelessly transmitting messages to the audio source device via the first wireless link, and
         enabling the second audio sink device to wirelessly receive the audio content from the audio source device via a second wireless link between the second audio sink device and the audio source device, and enabling the second audio sink device to wirelessly transmit messages to the audio source device via the second wireless link;
      compare a first link quality of the first wireless link, with a second link quality of the second wireless link; and
      in response to the first link quality being better than the second link quality, select the first audio sink device to bidirectionally communicate with the audio source device, by:
         enabling the first audio sink device to wirelessly receive the audio content from the audio source device via the first wireless link, and enabling the first audio sink device to wirelessly transmit messages to the audio source device via the first wireless link, and
         enabling the second audio sink device to wirelessly receive the audio content from the audio source device via the second wireless link, and disabling the second audio sink device from wirelessly transmitting messages to the audio source device via the second wireless link.

19. The system of claim 18, wherein the link manager is further configured to:
   in response to the second link quality being better than the first link quality, select the second audio sink device to bidirectionally communicate with the audio source device.

20. The system of claim 18, wherein the first audio sink device and the second audio sink device are configured to communicate synchronization information via the hybrid link prior to receiving the audio content from the audio source device.

\* \* \* \* \*